US012548941B1

(12) United States Patent
Wu et al.

(10) Patent No.: US 12,548,941 B1
(45) Date of Patent: Feb. 10, 2026

(54) ULTRA-THIN LIFTING BELT ANTI-SINGLE PLUG SAFETY DOOR SOCKET

(71) Applicant: Dongguan Heincro Technology Co., Ltd, Dongguan (CN)

(72) Inventors: Xuexiang Wu, Guangdong (CN); Junwen Xiong, Nanchang (CN)

(73) Assignee: Dongguan Heincro Technology Co., Ltd, Dongguan (CN)

( * ) Notice: Subject to any disclaimer, the term of this patent is extended or adjusted under 35 U.S.C. 154(b) by 0 days.

(21) Appl. No.: 19/015,795

(22) Filed: Jan. 10, 2025

(30) Foreign Application Priority Data

Aug. 8, 2024 (CN) ........................ 202421908215.9

(51) Int. Cl.
*H01R 13/14* (2006.01)
*H01R 13/52* (2006.01)

(52) U.S. Cl.
CPC ......... *H01R 13/5213* (2013.01); *H01R 13/14* (2013.01)

(58) Field of Classification Search
None
See application file for complete search history.

(56) References Cited

U.S. PATENT DOCUMENTS

| | | | | | |
|---|---|---|---|---|---|
| 5,066,238 | A * | 11/1991 | Shieh | H01R 13/4532 | |
| | | | | 439/139 | |
| 8,297,996 | B2 * | 10/2012 | Chuang | H01R 13/7032 | |
| | | | | 439/188 | |
| 10,243,296 | B2 * | 3/2019 | Cheng | H01R 13/18 | |
| 2014/0051287 | A1 * | 2/2014 | Liao | H01R 13/4534 | |
| | | | | 439/607.01 | |

* cited by examiner

*Primary Examiner* — Tho D Ta
(74) *Attorney, Agent, or Firm* — Nicholas Makridakis

(57) ABSTRACT

An ultra-thin lifting belt anti-single plug safety door socket is provided, including a socket lower cover, a socket cover, and a mounting seat. The socket cover is provided on the top of the socket lower cover, and a socket panel is provided on both sides of a top of the socket cover. The mounting seat is provided between the socket cover and the socket lower cover, and both sides of a top of the mounting seat are provided with gear sliding blocks, lifting springs, anti-single plug safety doors, safety door springs and safety door brackets, respectively. By making reasonable use of the existing extremely space of this product, the socket lifting and safety protection functions can be achieved, so that the entire product is more compact and light, safe, beautiful, and can be better stored and carried, increasing the experience.

7 Claims, 4 Drawing Sheets

ULTRA-THIN LIFTING BELT ANTI-SINGLE PLUG SAFETY DOOR SOCKET

TECHNICAL FIELD

The present application relates to the technical field of sockets, especially a new ultra-thin lifting belt anti-single plug safety door socket.

BACKGROUND

Socket refers to a seat that one or more circuit wirings may be inserted thereto, through it may be inserted into a variety of wiring, so that it is easy to connect with other circuits, through the connection and off between the wirings and the inducers, to achieve the final part of the circuit connected and off.

The existing product socket is generally integrated with a product shell, the socket can not be lifted, or does not take an anti-single plug safety door, so there is a safety risk of electric shock, and the volume is large, the overall thick, occupy a large space, storage and carrying is not convenient, for the later packaging and transportation cost waste is larger.

Therefore, it is necessary to provide a new type of ultra-thin lifting belt anti-single plug safety door socket to solve the above technical problems.

SUMMARY

The present disclosure provides a new type of ultra-thin lift belt anti-single security door socket, which can solve the problems that existing product sockets are commonly with the product shell, resulting in the socket can not be lifted, or do not have the anti-single security door, thus posing potential electric shock, and also has a large volume and an overall weight, occupies a larger space, inconvenient to store and carry, and wastes a lot of packaging and transportation cost.

In order to solve the above technical problems, the present disclosure provides a new type of ultra-thin lifting belt anti-single plug safety door socket, including: a socket lower cover; a socket cover; and a mounting seat.

The socket cover is provided on a top of the socket lower cover, and a socket panel is provided on both sides of a top of the socket cover.

The mounting seat is provided between the socket cover and the socket lower cover, and both sides of a top of the mounting seat are provided with gear sliding blocks, lifting springs, anti-single plug safety doors, safety door springs and safety door brackets, respectively.

Preferably, a first socket guide, a second socket guide and a third socket guide are provided at a bottom of the mounting seat.

Preferably, one side of the socket cover is fixed with an elastic device, and a surface of the elastic device is provided with a support device.

Preferably, the elastic device includes a mounting block, a fixing slot, a fixing rod, an clastic member, and a limit block. The mounting block is fixed on a surface of the socket cover, the fixing slot is provided in a middle of one side of the mounting block, the fixing rod is fixed inside the fixing slot, the elastic member is configured to sleeve on one side of an outer surface of the fixing rod, and the limit block is fixed at one end of the fixing rod.

Preferably, the support device includes a support block, a setting hole, and a limit cavity. The support block is slidably provided inside the fixing slot, the setting hole is provided in a middle of one side of the support block and the limit cavity is provided in an interior of the support block.

Preferably, a bottom end of the elastic member is firmly connected to a bottom of the fixing slot, and a top end of the elastic member is firmly connected to a surface of the support block.

Preferably, the limiting cavity is connected to the setting hole.

Compared with the related techniques, the ultra-thin lifting belt anti-single plug safety door socket of the present disclosure has the following beneficial effects.

The ultra-thin lifting belt anti-single plug safety door socket of the present disclosure, through the cooperation of the socket lower cover, the socket cover, the socket panel, the gear connecting rod, the gear sliding blocks, the lifting springs, the anti-single plug safety doors, the safety door springs, the safety door brackets, the mounting seat, the first socket guide, the second socket guide and the third socket guide, one (or more) lifting socket function can be achieved in an extremely ultra-thin space volume. Moreover, by setting up the single insert security door with safety protection, which can provide a better protection against electric shock. By making reasonable use of the existing extremely space of the product, the socket lifting and safety protection functions can be achieve, so that the entire product is more compact and light, safe, beautiful, and can be better stored and carried, increasing the experience.

Figure 1:
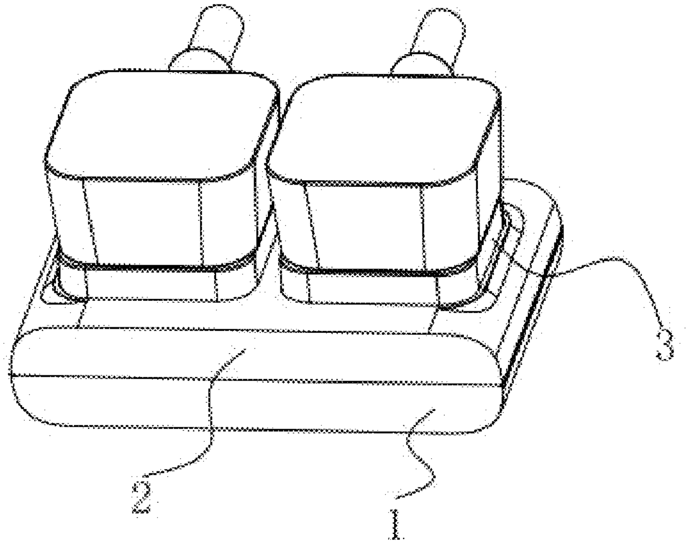
FIG. 1 shows a structural schematic diagram of an ultra-thin lifting belt anti-single plug safety door socket in accordance with some embodiments of the present disclosure.

In the drawings, reference signs are as follows. 1. Socket lower cover; 2. Socket cover; 3. Socket panel; 4. Gear connecting rod; 5. Gear sliding block; 6. Lifting spring; 7. Anti-single plug safety door; 8. Safety door spring; 9. Safety door bracket; 10. Mounting seat; 12. First socket guide; 13. Second socket guide; 14. Third socket guide; 15. Elastic device; 151. Mounting block; 152. Fixing slot; 153. Fixing rod; 154. Elastic member; 155. Limit block; 16. Support device; 161. Support block; 162. Setting hole; 163. Limit cavity. 41. Connecting rod; 42. Gear; 43. Connecting hole; 51. Protrusion; 52. Gear; 91. Joint pin.

DETAILED DESCRIPTION OF THE EMBODIMENTS

The ultra-thin lifting belt anti-single plug safety door socket of the present disclosure is further explained below in conjunction with the accompanying drawings and the embodiments.

Figure 2:
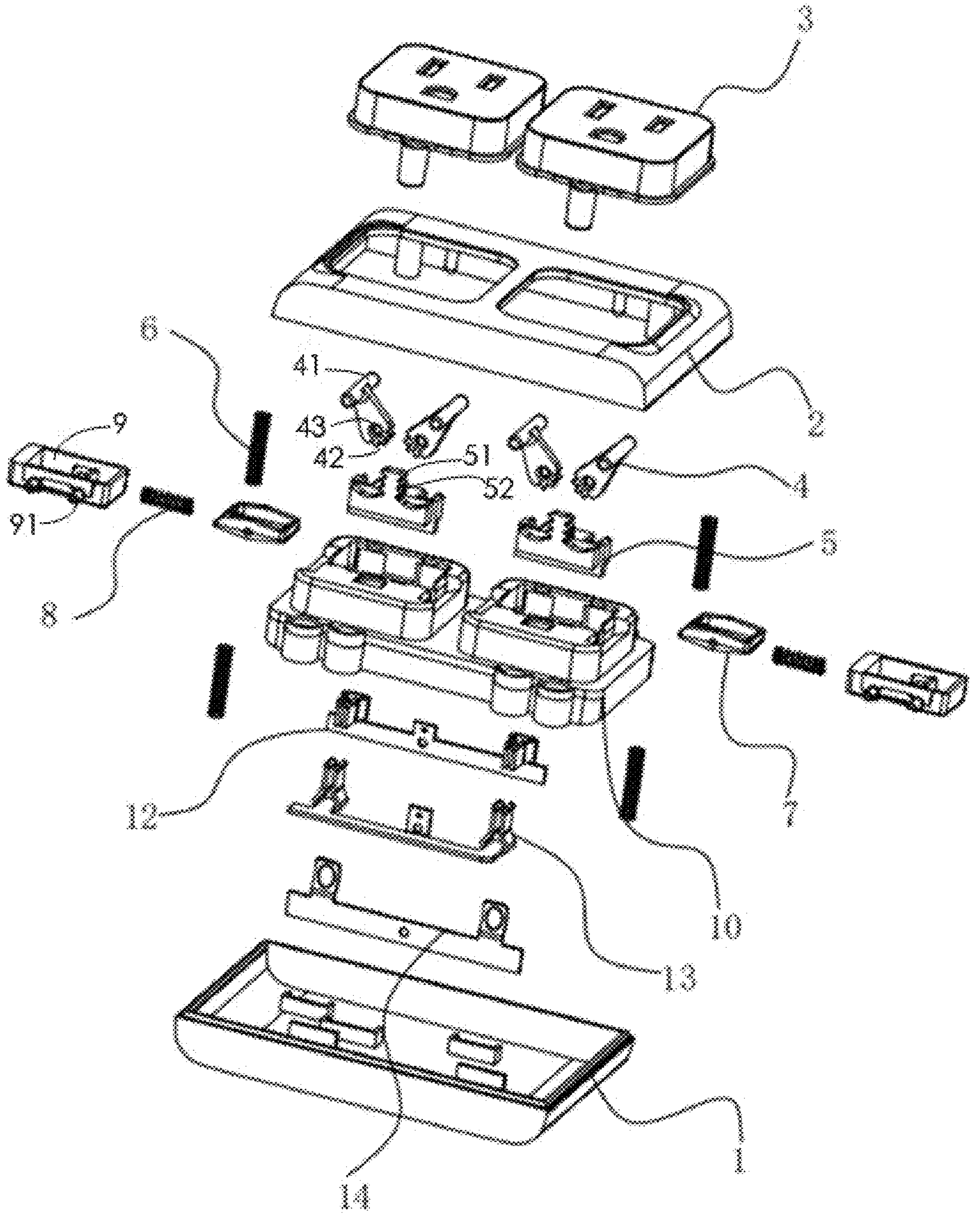
FIG. 2 shows an exploded view of the ultra-thin lifting belt anti-single plug safety door socket in accordance with some embodiments of the present disclosure.
Figure 3:
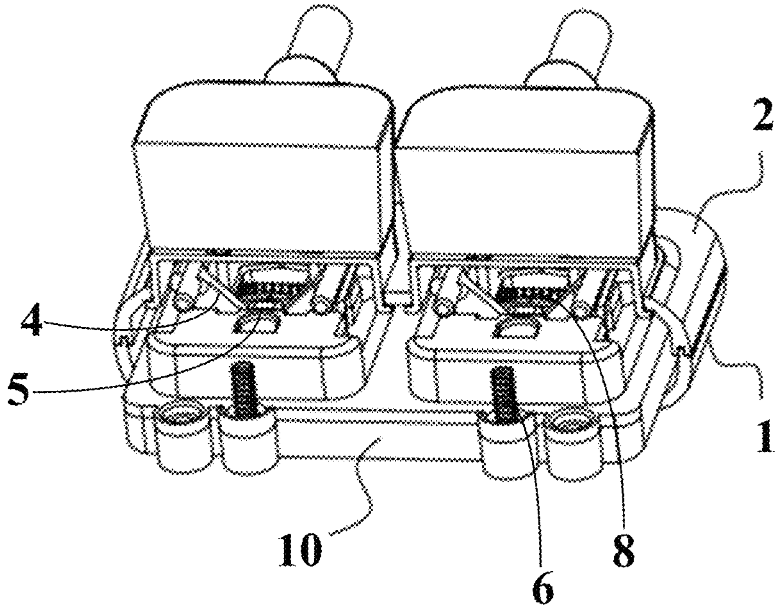
FIG. 3 shows an exploded view of a lower socket cover shown in FIG. 1.

Referring to FIGS. 1, 2 and 3, where FIG. 1 shows a structural schematic diagram of the ultra-thin lift belt anti-single plug safety door socket in accordance with some embodiments of the present disclosure; FIG. 2 shows an exploded view of the ultra-thin lift belt anti-single plug safety door socket in accordance with some embodiments of the present disclosure; FIG. 3 shows a schematic diagram of a socket lower cover shown in FIG. 1.

Specifically, in some embodiments of the present disclosure, a new type of ultra-thin lifting belt anti-single plug safety door socket is provided, including:

a socket lower cover 1;

a socket cover 2, which is provided on a top of the socket lower cover 1, and a socket panel 3 is provided on both sides of a top of the socket cover 2;

a mounting seat 10, which is provided between the socket cover 2 and the socket lower cover 1, and both sides of a top of the mounting seat 10 are provided with gear sliding blocks 5, lifting springs 6, anti-single plug safety doors 7, safety door springs 8 and safety door brackets 9, respectively.

The bottom of the mounting seat 10 is provided with a first socket guide 12, a second socket guide 13 and a third socket guide 14.

The working principle of the ultra-thin lifting belt anti-single plug safety door socket of the present disclosure is as follows.

When working, firstly, when the power cord plug is inserted into the socket, through the anti-single plug security door 7*s* to contact with the internal gear sliding blocks 5, the downward pressure of the power cord plug, drives the gear sliding blocks 5 to descend. At the same time, the matching gear will drive the gear connecting rod 4 to rotate, causing the gear connecting rod 4 to rotate, and meanwhile based on the principle of lever, to lift up the socket panel 3. In addition, by using the clamping force of the three hardware guide inside the socket, the plug is clamped, thereby enabling the socket part to achieve the function of lifting.

Compared with the related techniques, the ultra-thin lifting belt anti-single plug safety door socket of the present disclosure has the following beneficial effects.

The ultra-thin lifting belt anti-single plug safety door socket of the present disclosure, through the cooperation of the socket lower cover 1, the socket cover 2, the socket panel 3, the gear connecting rod 4, the gear, the sliding blocks 5, the lifting springs 6, the anti-single plug, safety doors 7, the safety door springs 8, the safety door brackets 9, the mounting seat 10, the first socket guide 12, the second socket guide 13 and the third socket guide 14, one (or more) lifting socket function can be achieved in an extremely ultra-thin space volume. Moreover, by setting up the anti-against the single insert security doors 7 with safety protection, which can provide a better protection against electric shock, making reasonable use of the existing extremely space of the product, the socket lifting and safety protection functions can be achieved, so that the entire product is more compact and light, safe, beautiful, and can be better stored and carried, increasing the experience.

Figure 4:
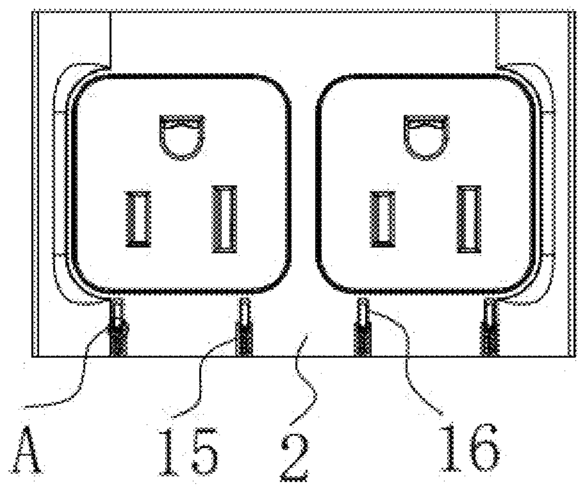
FIG. 4 shows another structural diagram of the ultra-thin lifting belt anti-single plug safety door socket in accordance with some embodiments of the present disclosure.
Figure 5:
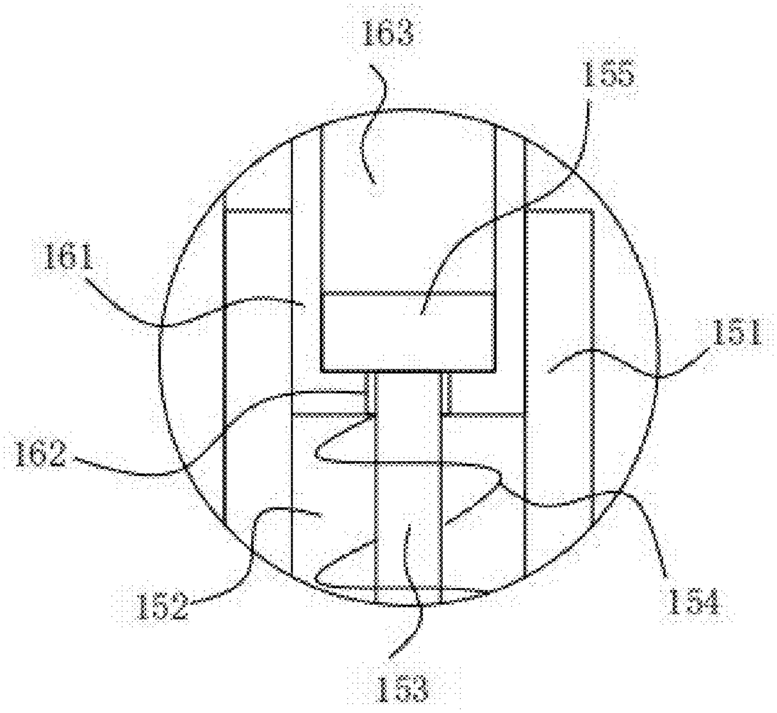
FIG. 5 shows an enlarged view of part A shown in FIG. 4.

Referring to FIG. 4 and FIG. 5, which show another structural schematic diagram of the ultra-thin lifting belt anti-single plug safety door socket in accordance with some embodiments of the present disclosure.

Specifically, in some other embodiments of the present disclosure, difference between the ultra-thin lift belt anti-single plug safety door socket of the present disclosure and the one described above in that, one side of the socket cover 2 is fixedly installed with an elastic device 15, and the surface of the clastic device 15 is provided with a support device 16.

The clastic device 15 includes a mounting block 151, a fixing slot 152, a fixing rod 153, an elastic member 154 and a limit block 155. The mounting block 151 is fixed on the surface of the socket cover 2, the fixing slot 152 is provided in the middle of one side of the mounting block 151, the fixing rod 153 is fixed to the interior of the fixing slot 152, the elastic member 154 is configured to sleeve on one side of the outer surface of the fixing rod 153, and the fixing block 155 is fixed to one end of the fixing rod 153.

The support device 16 includes a support block 161, a setting hole 162, and a limit cavity 163. The support block 161 is slidably mounted inside the fixing slot 152, the setting hole 162 is provided in the middle of one side of the support block 161, and the limit cavity 163 is provided inside the support block 161.

The bottom end of the elastic member 154 is fixedly connected to the bottom of the fixing slot 152, and the top end of the elastic member 154 is fixedly connected to the surface of the support block 161.

The limiting cavity 163 is connected with the setting hole 162.

The working principle of the ultra-thin lifting belt anti-single plug safety door socket of the present disclosure is as follows.

When operating, first the plug is first inserted into the socket panel 3, the plug surface is supported on the surface of the support block 161, and the resilient elasticity of the elastic member 154 pushes the plug, so that the plug is stably inserted into the socket panel 3.

Compared with the related techniques, the ultra-thin lifting belt anti-single plug safety door socket of the present disclosure has the following beneficial effects.

The ultra-thin lifting belt anti-single plug safety door socket of the present disclosure, by installing the support device 15 and the support device 16 on the surface of the socket cover 2, the plug is supported to prevent it from loosening and slipping when being inserted into the socket panel 3. This device has a simple structure, and strong practicality, maintaining the stability of the plug when being inserted in the socket panel 3, and preventing it from loosening.

The above is only some embodiments of the present disclosure, but not limits the scope of protection of the present disclosure. Any equivalent structure or equivalent process transformation made by using the specification and the drawings of the present disclosure, or directly or indirectly used in other related technical fields, shall be included in the scope of protection of the present invention.

The invention claimed is:

1. An ultra-thin lifting belt anti-single plug safety door socket, comprising:

a socket lower cover;

a socket cover, wherein the socket cover is provided on a top of the socket lower cover, and a socket panel is provided on both sides of a top of the socket cover; and a mounting seat, wherein the mounting seat is provided between the socket cover and the socket lower cover, four corners of an upper surface of the mounting seat are provided with lifting springs, and both sides of the upper surface of the mounting seat each is provided with a gear sliding block, two gear connecting rods, an anti-single plug safety door, a safety door spring and a safety door bracket; and wherein the gear sliding block comprises a protrusion and gears arranged on both sides of the protrusion; each of the two gear connecting rods comprises a connecting rod, a gear, and a connecting hole; one side of the safety door bracket is provided with two joint pins;

wherein the gear sliding block is configured to be engaged with the two gear connecting rods through interlocking gears, the safety door spring is placed in the anti-single plug safety door, and the anti-single plug safety door is fixed within the safety door bracket; and wherein the two joint pins of the safety door bracket are inserted into connecting holes of the two gear connecting rods, respectively.

2. The ultra-thin lifting belt anti-single plug safety door socket according to claim 1, wherein a first socket guide, a second socket guide and a third socket guide are provided at a bottom of the mounting seat.

3. The ultra-thin lift belt anti-single plug safety door socket according to claim 1, wherein one side of the socket cover is fixed with an elastic device and a surface of the elastic device is provided with a support device.

4. The ultra-thin lift belt anti-single plug safety door socket according to claim 3, wherein the elastic device comprises a mounting block, a fixing slot, a fixing rod, an elastic member, and a limit block; and wherein the mounting block is fixed on a surface of the socket cover, the fixing slot is provided in a middle of one side of the mounting block, the fixing rod is fixed inside the fixing slot, the elastic member is configured to sleeve on one side of an outer surface of the fixing rod, and the limit block is fixed at one end of the fixing rod.

5. The ultra-thin lift belt anti-single plug safety door socket according to claim 4, wherein a bottom end of the elastic member is fixedly connected to a bottom of the fixing slot and a top end of the elastic member is fixedly connected to a surface of the support block.

6. The ultra-thin lift belt anti-single plug safety door socket according to claim 3, wherein the support device comprises a support block, a setting hole, and a limit cavity; and wherein the support block is slidably provided inside the fixing slot, the setting hole is provided in a middle of one side of the support block, and the limit cavity is provided in an interior of the support block.

7. The ultra-thin lift belt anti-single plug safety door socket according to claim 6, wherein the limit cavity is connected to the setting hole.

* * * * *